(12) United States Patent
Beller et al.

(10) Patent No.: US 10,769,539 B2
(45) Date of Patent: Sep. 8, 2020

(54) AUTOMATIC EVALUATION OF A KNOWLEDGE CANVASSING APPLICATION

(71) Applicant: INTERNATIONAL BUSINESS MACHINES CORPORATION, Armonk, NY (US)

(72) Inventors: Charles E. Beller, Baltimore, MD (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 15/238,172

(22) Filed: Aug. 16, 2016

(65) Prior Publication Data

US 2018/0053098 A1 Feb. 22, 2018

(51) Int. Cl.
*G06N 5/04* (2006.01)
*G06F 16/901* (2019.01)
*G06N 5/02* (2006.01)

(52) U.S. Cl.
CPC .......... *G06N 5/04* (2013.01); *G06F 16/9024* (2019.01); *G06N 5/022* (2013.01)

(58) Field of Classification Search
CPC ....... G06N 5/04; G06N 5/022; G06F 16/9024
See application file for complete search history.

(56) References Cited

U.S. PATENT DOCUMENTS

| 7,966,379 B2 | 8/2011 | Jain |
| 9,367,608 B1 | 6/2016 | Zhang |
| 2015/0095316 A1 | 4/2015 | Nie et al. |
| 2015/0178273 A1 | 6/2015 | Hakkani-Tur et al. |
| 2016/0098645 A1 | 4/2016 | Sharma et al. |
| 2016/0132501 A1* | 5/2016 | Mengle ................. G06F 16/288 707/771 |

(Continued)

OTHER PUBLICATIONS

Ofer Dekel, Joseph Keshet, and Yoram Singer, "Large margin hierarchical classification." In Proceedings of the twenty-first international conference on Machine learning (ICML '04), Jul. 2004 (Year: 2004).*

(Continued)

*Primary Examiner* — Austin Hicks
(74) *Attorney, Agent, or Firm* — Conley Rose, P.C.

(57) ABSTRACT

A system includes a knowledge canvassing system executed by a computer, a processor, and a memory coupled to the processor. The memory is encoded with instructions that when executed cause the processor to provide a training system configured to generate benchmark data, each benchmark datum including a set of one or more benchmark input entities and a set of one or more benchmark output entities associated with the one or more benchmark input entities, query the knowledge canvassing system with each set of benchmark input entities, receive, for each set of benchmark input entities queried, an output result from the knowledge canvassing system that includes a set of zero or more knowledge canvassing system output entities, and generate an evaluation score for each set of knowledge canvassing system output entities based on a comparison of the knowledge canvassing system output entities with the set of benchmark output entities.

15 Claims, 7 Drawing Sheets

(56) References Cited

U.S. PATENT DOCUMENTS

2017/0075935 A1    3/2017  Lagos

OTHER PUBLICATIONS

Maynard, Diana & Peters, Wim & Li, Yaoyong, "Metrics for evaluation of ontology-based information extraction.", Jan. 2006, CEUR Workshop Proceedings, 179 (Year: 2006).*
Maynard, Diana & Peters, Wim & Li, Yaoyong, "Metrics for evaluation of ontology-based information extraction.", Jan. 2006, CEUR Workshop Proceedings, 179 (Year: 2006) (Year: 2006).*
Yih, Scott Wen-tau, Ming-Wei Chang, Xiaodong He, and Jianfeng Gao. "Semantic parsing via staged query graph generation: Question answering with knowledge base." (2015). (Year: 2015).*
Cui et al, Question Answering Passage Retrieval Using Dependency Relations, 2005, ACM, SIGIR '05, p. 400-407 (Year: 2005).*
Voskarides et al., "Learning to Explain Entity Relationships in Knowledge Graphs," Proceedings of the 53rd Annual Meeting of the Association for Computational Linguistics, & the 7th International Joint Conference on Natural Language Processing, pp. 564-574, Jul. 26-31, 2015.
Weisstein, E. W., "Harmonic Series," from MathWorld, available at http://web.archive.org/web/20151125053256/http://mathworld.wolfram.com/HarmonicSeries.html (Nov. 20, 2015).
Office Action dated Mar. 5, 2019, 29 pages, U.S. Appl. No. 15/238,273.
Dredze, et al., "Entity Disambiguation for Knowledge Base Population," in Proc. 23rd Inf. Conf. Computational Linguistics 277-285 (2010).
Office Action dated Jul. 19, 2019, 18 pages, U.S. Appl. No. 15/238,273.
Office Action dated Oct. 10, 2019, 15 pages, U.S. Appl. No. 15/238,273.

* cited by examiner

AUTOMATIC EVALUATION OF A KNOWLEDGE CANVASSING APPLICATION

STATEMENT REGARDING FEDERALLY SPONSORED RESEARCH OR DEVELOPMENT

This invention was made with Government support under Agreement No. 2013-12101100008 awarded by The Department of Defense. The Government has certain rights to this invention.

STATEMENT REGARDING PRIOR DISCLOSURES BY THE INVENTOR OR A JOINT INVENTOR

N/A.

BACKGROUND

The present disclosure relates to evaluation and training of cognitive computing systems, and more specifically, to techniques and mechanisms for improving the results generated by a knowledge canvassing system.

Generally, a graph, knowledge graph, or graph network, can be utilized to represent facts. A graph database, also known as a semantic information network or a network database, includes a (usually sparsely, but multiply connected) directed graph with information stored at named nodes and information relating nodes stored at named directed edges. Knowledge canvassing consists of a user input of information, disambiguation of the input information to known information stored in the knowledge graph, and the return of selected result information drawn from the relationships stored in the knowledge graph. In some systems, text passages that provide evidence of the identified relationships may also be returned. Knowledge canvassing systems are often designed to return the most interesting and/or meaningful information related to the input information to provide a response to a user's general interest in the query information.

SUMMARY

According to an embodiment, a method includes generating benchmark data. Each benchmark datum includes a set of one or more benchmark input entities and a set of one or more benchmark output entities associated with the one or more benchmark input entities. The method also includes querying, by a training system executing on a computer, a knowledge canvassing system with each set of benchmark input entities. The method also includes receiving, by the training system, for each set of benchmark input entities queried, an output result from the knowledge canvassing system. The output result includes a set of zero or more knowledge canvassing system output entities. The method also includes generating, by the training system, an evaluation score for each set of knowledge canvassing system output entities based on a comparison of the knowledge system output entities with the set of benchmark output entities. The comparison, in an embodiment of the method, may include matching a knowledge canvassing system output entity from one set of knowledge canvassing system output entities to a benchmark output entity from one set of benchmark output entities. In an embodiment of the method, the evaluation score may further be based on an estimation of a degree to which an unmatched knowledge canvassing system in one set of knowledge canvassing system output entities relates to any benchmark output entity from a set of benchmark output entities, in some embodiments, based on proximity in a knowledge graph. In an embodiment of the method, the evaluation score includes a summary coverage score and a maximum coverage score. The maximum coverage score may be based on the size of one set of benchmark output entities. The summary coverage score may be related to a percentage of benchmark output entities matched by one set of knowledge canvassing system output entities. An embodiment of the method may also include assigning weights to each benchmark output entity to generate a weighted benchmark output entity. Thus, in an embodiment, the comparison may include matching a knowledge canvassing system output entity from one set of knowledge canvassing system output entities to a weighted benchmark output entity from one set of weighted benchmark output entities. An embodiment of the method may also include aggregating the evaluation scores. Additionally, an embodiment of the method may also include training the knowledge canvassing system based on the evaluation scores.

In another embodiment, a system/apparatus is provided. The system/apparatus includes a knowledge canvassing system executed by a computer, one or more processors, and memory. The memory is encoded with instructions that when executed cause the one or more processors to provide a training system for training the knowledge canvassing system. The training system may be configured to perform various ones of, and various combinations of, the operations described above with respect to embodiments of a method.

In a further embodiment, a computer program product including a computer readable storage medium encoded with program instructions is provided. The program instructions are executable by a computer to cause the computer to perform various ones of, and various combinations of, the operations described above with respect to embodiments of a method.

DETAILED DESCRIPTION

A knowledge graph is a representation of distinct entities (i.e., people, businesses, accounts, artifacts, etc.) and relationships that hold between those entities, along with references to elements of text that support some or all of those relationships. Users may wish to exploit the information contained in a knowledge graph through knowledge canvassing. Knowledge canvassing may consist of a user inputting one or more entity names into a system. The system may act to disambiguate the input names to known entities in the knowledge graph and return a selected set of result entities drawn from the entities with relationships to the one or more input entities. Additionally, text passages that provide evidence of the identified relationships may also be returned. However, evaluating the set of returned entities to determine whether the system is returning meaningful related entities is difficult because many entities may be linked to the one or more input entities through various text passages. Therefore, it is desirable to develop a training system to evaluate the knowledge canvassing system not only based on links between entities, but based on the importance of the relationship.

In accordance with the disclosed principles, a system is provided that determines accuracy metrics for a returned set of result entities from a knowledge canvassing query with respect to the disambiguated input entities. Furthermore, the system may, in some embodiments, act to train the knowledge canvassing system to return better result entities for future queries. In order to evaluate the response entities provided by the knowledge canvassing system, benchmark data (i.e., gold standard data) are generated and supplied to the system. The benchmark data comprise at least one set of one or more input entities and a corresponding set of one or more benchmark output entities that consist of important entities related to the set of input entities. In some embodiments, human judges may create the benchmark data; while in other embodiments, the training system itself may create the benchmark data.

Once the benchmark data are created, the one or more input entities utilized to create the benchmark output entities is input as a query into the knowledge canvassing system. The knowledge canvassing system processes the query with respect to a stored knowledge graph and returns output entities related to the input entities. The training system receives these output entities and compares the output entities to the benchmark output entities to generate an evaluation score. The evaluation score may include full credit for identical matches between the output entities generated by the knowledge canvassing system and the benchmark output entities. Additionally, the evaluation score may include partial credit where unmatched output entities are considered based on the proximity between the output entities generated by the knowledge canvassing system and the benchmark output entities in the knowledge graph. Furthermore, the evaluation score may include partial credit based on the returned passages from the knowledge canvassing system. In this way, the system may evaluate the knowledge canvassing system not only based on links between entities, but based on the importance of the relationship. The system then may be able to train the knowledge canvassing system to perform better in future queries based on the evaluation.

Figure 1:
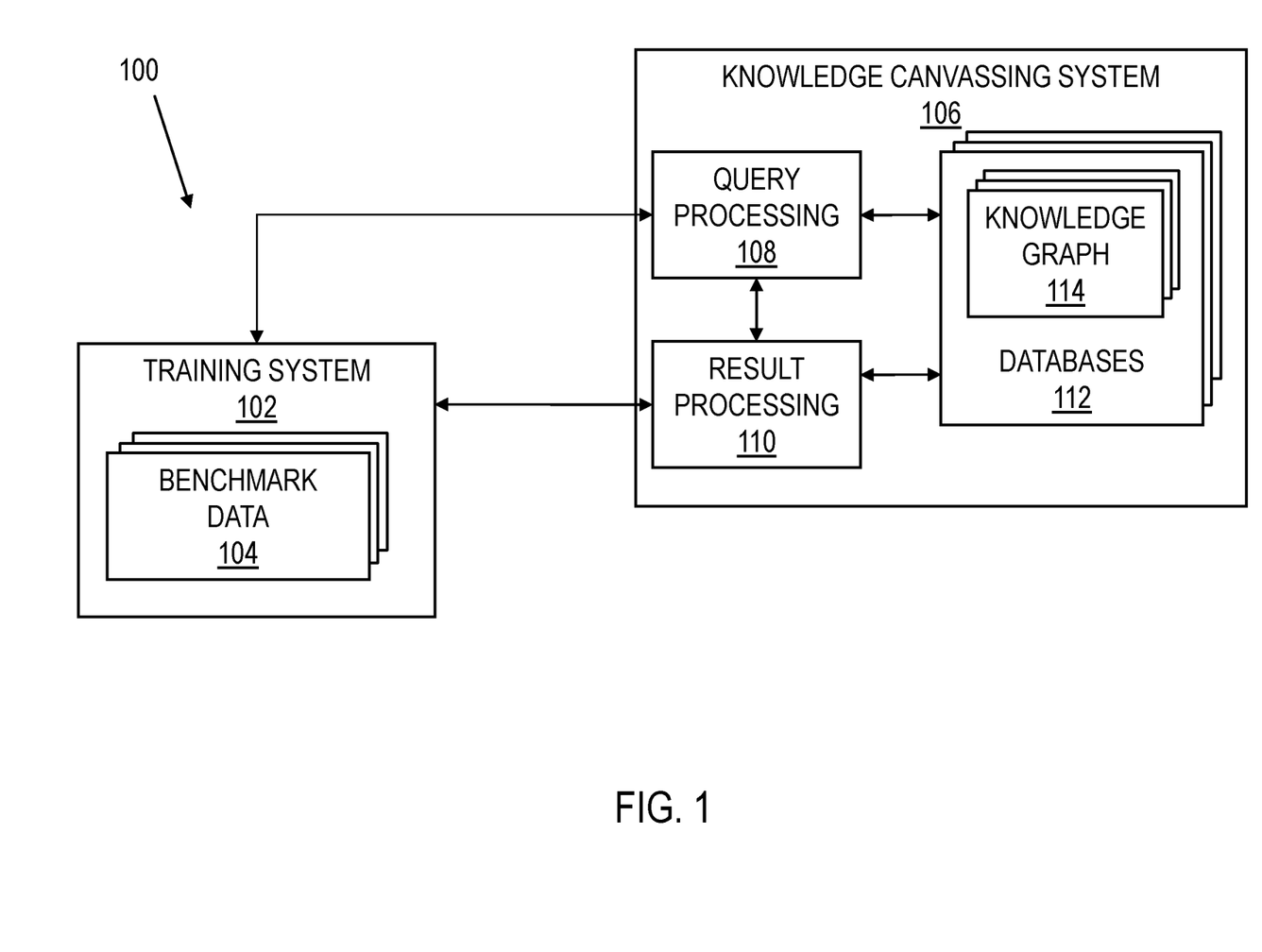
FIG. 1 shows an illustrative block diagram of a system that provides evaluation and training for a knowledge canvassing system in accordance with various embodiments.

FIG. 1 shows an illustrative block diagram of a system 100 that provides evaluation and training for a knowledge canvassing system 106 in accordance with various embodiments. The system 100 may include knowledge canvassing system 106 and training system 102. The knowledge canvassing system 106 is a machine learning system that receives training from the training system 102. The training guides and adjusts the operation of the knowledge canvassing system 106 to improve the quality of results provided by the knowledge canvassing system 106. The knowledge canvassing system 106 is illustrative and is not intended to state or imply any limitation with regard to the type of mechanisms with which various embodiments may be implemented. Many modifications to the example knowledge canvassing system 106 may be implemented in various embodiments.

The system 100, including the knowledge canvassing system 106 and the training system 102, may be implemented on one or more computing devices (comprising one or more processors and one or more memories, and optionally including any other computing device elements generally known in the art including buses, storage devices, communication interfaces, and the like).

The knowledge canvassing system 106 may include query processing 108, result processing 110, and one or more knowledge graphs 114 that are stored in databases 112. In some embodiments, the knowledge graphs 114 represent an abstraction for representing and processing data. A knowledge graph 114 may include graph structures with nodes, edges, and properties to represent and store data. "Nodes" represent entities such as people, businesses, accounts, artifacts, etc. "Edges" represent relationships between pairs of entities. "Properties" are pertinent information that relate to nodes or edges. Thus, the knowledge graph 114 may be a representation of distinct entities (or entities believed to be distinct) and relationships that hold between those entities, along with references to elements of text that support some or all of those relationships. In some embodiments, database 112 may include one or more relational databases, one or more graph databases, one or more flat files, and/or any other form of storage that enables the representation of the information depicted in knowledge graph 114.

Frameworks exist to support querying and analytics over graph data, and methods have been developed to answer various forms of user queries by traversing graphs. The query processing 108 receives queries to be responded to by the knowledge canvassing system 106. The queries may be provided by the training system 102 and/or a user (not shown). More specifically, a query may include an input received from a user and/or the training system 102 of one or more entity names. The query processing 108 may act to disambiguate the inputted entity names to known entities in the knowledge graph 114. The result processing 110 analyzes and compares the queried one or more entities with the nodes, edges, and properties contained in the knowledge graph and returns a selected set of result entities drawn from the entities in the knowledge graph 114 with relationships to the inputted one or more entities. The result processing 110 may also return text passages that provide evidence of the identified relationships. In other words, the result processing 110 is configured to return to the user and/or training system 102 an output result that includes a set of zero or more entities that have a relationship to the queried input one or more entities in the knowledge graph 114 as well as, in some embodiments, text that provides evidence of the relationship. The knowledge canvassing system 106 is configured to return the most meaningful and/or interesting related entities as results to provide a response to a user's general interest in the queried one or more entities.

In order to evaluate the output result provided by knowledge canvassing system 106, the output set of entities is provided to the training system 102. In other words, the training system 102 is configured to receive the output set of entities from the knowledge canvassing system 106. The training system 102 then may compare the output result generated by the canvassing system 106 with the benchmark data 104 that are stored in the training system 102, in some embodiments, in memory (not shown). The benchmark data 104 may include a benchmark set of output entities that correspond with a set of input entities to be queried for the evaluation. Thus, each benchmark datum includes a set of one or more benchmark input entities and a set of one or more benchmark output entities associated with the one or more benchmark input entities. For example, a benchmark input entity may be New York City. The set of benchmark output entities for the benchmark input entity New York City may include New York state, Manhattan, Brooklyn, Queens, the Bronx, Staten Island, etc. The training system 102 may query the knowledge canvassing system 106 with an input entity of New York City. The set of entities returned from the knowledge canvassing system 106 then may be compared to the set of benchmark output entities in the benchmark data 104 to evaluate the performance of the knowledge canvassing system 106 in returning meaningful entities. The benchmark set of entities may sometimes be referred to as "a gold standard" or "ground truth" set of entities.

Figure 2:
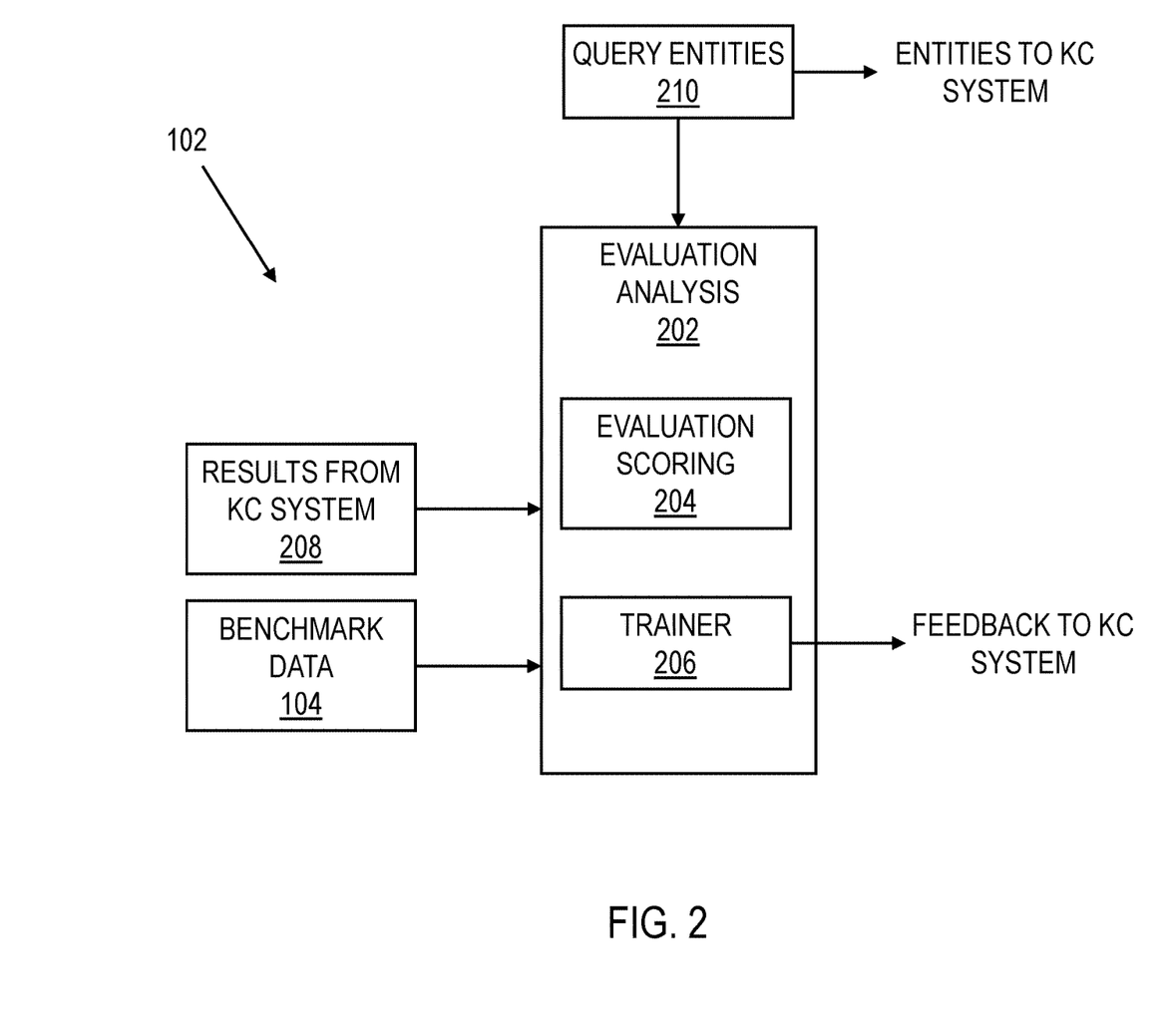
FIG. 2 shows an illustrative block diagram of a training system that provides evaluation and training of a knowledge canvassing system in accordance with various embodiments.

FIG. 2 shows an illustrative block diagram of a training system 102 that provides evaluation and training of knowledge canvassing system 106 in accordance with various embodiments. In some embodiments, the benchmark data 104 are generated by human judges and/or experts and provided to the training system 102. First, a collection of input entity sets may be selected as benchmark input entity sets from among entities in the knowledge graph 114. The benchmark input entity sets may include one or more entities. For example, the benchmark input entity set may be New York City or it may be New York City and baseball. In some embodiments, the selected sets of benchmark input entities include at least one set that has a single entity (i.e., a cardinality of 1) (e.g., New York City) and at least one set that has multiple entities (e.g., New York City and baseball). In some embodiments, the training system 102 may select the sets of benchmark input entities while in alternative embodiments, other systems or humans may select the sets of benchmark input entities. The sets of benchmark input entities may be selected based on sample user queries of the canvassing system 106, random selections from the knowledge graph 114, human judges selecting entities that are likely to represent the types of entities of interest, or any other method. Each input benchmark entity set becomes a single datum in the benchmark data 104.

For each single datum (i.e., for each input benchmark entity set), one or more human judges may manually construct a list of what each judge deems as important related entities. For a benchmark input entity set of cardinality 1, the related entities (i.e., the set of benchmark output entities) are entities which each judge deems as important entities related to the benchmark input entity. For example, a judge may deem Manhattan and Brooklyn important related entities (thus making up a benchmark output entity set) for the benchmark input entity set New York City. For a benchmark input entity set containing multiple entities, the set of benchmark output entities constructed by each judge are entities which each judge deems as important entities related to a concept implied by the combination of the entities in the benchmark input entity set. For example, if the benchmark input entity set includes New York City and baseball, a judge may deem Yankees and Mets as the set of benchmark output entities. In some embodiments, each judge may also assign a weight to each entity that makes up a benchmark output entity set. For example, a judge may deem Manhattan as more important than Brooklyn for the benchmark input entity set New York City. Thus, that judge may assign Manhattan a weight of 0.75 while assigning Brooklyn a weight of 0.25. If no weight is assigned to a particular benchmark output entity, the weight may be considered to be 1.

Once each of the judges has constructed his or her own benchmark output entity set for a given benchmark input entity set, the overall benchmark output entity set for the given benchmark input entity set that may be utilized for comparison with the output entity set from knowledge canvassing system 106 may be defined by the union of the associated benchmark output entity sets from all of the judges. Furthermore, the weight of a particular entity in the overall benchmark output entity set may be defined by the sum of weights assigned to each particular entity by each of the judges. In some embodiments, if no weights are assigned to a particular benchmark output entity by the judges, the weight entity in the overall benchmark output entity set may be defined by the sum of the number of human judges that listed the particular entity as a benchmark output entity.

In some embodiments, the benchmark data 104 are generated by the training system 102 without the need for human judges providing benchmark output entities. First, a collection of input entity sets may be selected as benchmark input entity sets from among entities in the knowledge graph 114. The benchmark input entity sets may include one or more entities. In some embodiments, the training system 102 may select the sets of benchmark input entities while in alternative embodiments, other systems or humans may select the sets of benchmark input entities and provide the training system 102 with the benchmark input entities. The sets of benchmark input entities may be selected based on sample user queries of the canvassing system 106, random selections from the knowledge graph 114, human judges selecting entities that are likely to represent the types of entities of interest, or any other method. Each input benchmark entity set becomes a single datum in the benchmark data 104.

If the benchmark input entity set is a singleton set (i.e., has a cardinality of 1), training system 102 resolves the benchmark input entity to an entry in a knowledge base of reference documents. In some embodiments, the training system 102 may match the title of an entry in a knowledge base of reference documents to the benchmark input entity. The knowledge base of reference documents may be any reference resource such as encyclopedias, non-fiction literature, maps, and/or other online or offline resources. For example, the training system 102 may crawl an online encyclopedia and/or stored encyclopedia and title match an entry in the encyclopedia to the benchmark input entity. Thus, if the benchmark input entity is New York City, the training system 102 may match New York City to an entry titled "New York City" in an online encyclopedia.

The training system 102 then may identity other entities included in the entry located in the knowledge base of reference documents, in some embodiments by running an information extraction tool over the entry. Continuing the previous example, the training system 102 may utilize an information extraction tool to crawl the online encyclopedia entry titled "New York City" to generate related benchmark output entities that are disclosed in the entry. Thus, for example, the online encyclopedia entry titled "New York City" may include entities in the entry such as Manhattan, Brooklyn, Queens, etc. The training system 102 may be configured to crawl the entry and retrieve those entities contained in the entry.

In some embodiments, training system 102 may assign weights to the benchmark output entities identified in the entry of the knowledge base of reference documents based on the location of the entity in the entry and/or the number of mentions of the entity in the entry. For example, a weight of $$\frac{1}{n}$$

may be assigned to each benchmark output entity located in the entry, where n is the paragraph number each entity first appears (i.e., based on location in the entry). Thus, in an example, if the training system 102 determines that benchmark output entity Manhattan is located in the entry for New York City in the second paragraph, the training system may assign the benchmark output entity Manhattan a weight of 0.5. In another embodiment, for each benchmark output entity e, the training system 102 may assign it a weight w(e), where w(e) is the number of mentions of e in the knowledge base entry (i.e., based on number of mentions). For example, if the benchmark output entity Manhattan is mentioned 7 times in the entry entitled "New York City," then the training system 102 may assign the benchmark output entity Manhattan a weight of 7. In another embodiment, the training system 102 may assign each benchmark output entity an initial weight of 0, and for each paragraph each benchmark output entity occurs in the entry, an incremental weight equal to $$\frac{1}{n}$$

is added to the weight to generate a total weight for that output entity, where n is the paragraph number the entity occurs in the entry (i.e., based on location and number of mentions in the entry). For example, if the benchmark output entity Manhattan occurs in paragraphs 2, 4, and 8 of the entry, then the total weight for the benchmark output entity Manhattan is $$w(e) = 0 + \frac{1}{2} + \frac{1}{4} + \frac{1}{8} = \frac{7}{8}.$$

If the benchmark input entity set is not a singleton set (i.e., has a cardinality of more than 1), training system 102 generates benchmark output entities as discussed above, by resolving each input entity in the set to a knowledge base of reference documents and identifying entities in the knowledge base of reference documents. The benchmark output entity set may then be generated by taking the partial intersection of the sets of identified entities. For example, an entity will be in the partial intersection so long as entities appear in two or more sets of identified entities. In other words, the benchmark output entity set includes any entity that links at least two of the benchmark input entities. If the benchmark input entity set has cardinality 2, then this is equivalent to the intersection (i.e., the identified entity is located in both knowledge base entries); however, it may differ for benchmark input entity sets of 3 or more (i.e., the identified entity is located in 2 or more of the knowledge base entries). In some embodiments, weights may be assigned to each of the benchmark output entities in each of the benchmark output entity sets based on location of an entity in the entry and/or number of mentions of the entity in the entry as discussed above. For example, the weights for the individual entity determinations may be summed, averaged, and/or normalized based on the number of words or number of paragraphs that the entity appears in the entry and then summed or averaged. In another embodiment, the training system 102 may assign a multiplicative or exponentiating factor for the number of individual entity sets in which a benchmark output entity appears, so as to more harshly penalize lower connectivity (as opposed to higher connectivity) when assigning the weight.

Once the benchmark data 104 has been generated and/or received by the training system 102, in an embodiment, a subset of the benchmark data 104 is identified by the training system 102 as a test set. If the benchmark data 104 are being utilized for evaluation, then the subset of benchmark data 104 may include the entire data set. If the training system 104 is being utilized for training of knowledge canvassing system 106, the benchmark data 104 may be partitioned into subsets to use for training and testing, or into subsets for training, development, and testing.

As discussed above, the training system 102 may submit each set of one or more benchmark input entities from the test set as query entities 210 to the knowledge canvassing system 106. In other words, each test set datum's benchmark input entity set is input into the knowledge canvassing system to query the knowledge graph 114. The knowledge canvassing system 106 then generates the output sets of entities associated with each benchmark input entity set as a result (including output entities 208). The training system 102 retrieves the resulting output entity sets 208 from the knowledge canvassing system 106. More particularly, the training system 102 may retrieve the results of the knowledge canvassing system 106 query for each test datum set.

Evaluation analysis 202 receives the resulting output entity sets 208 as well as the benchmark data 104, including the benchmark input entity sets and benchmark output entity sets. Evaluation scoring 204 may be configured to generate an evaluation score for each set of knowledge canvassing system output entities 208 based on a comparison of each output entity set 208 with its corresponding benchmark output entity set (i.e., the benchmark output entity set defined for that datum in the benchmark data 104). More particularly, the evaluation scoring may match the resulting output entities 208 from the knowledge canvassing system 106 with corresponding benchmark output entities and/or weighted benchmark output entities. In some embodiments evaluation scoring 204 utilizes the weighting defined in the benchmark data 104 in order to reflect the significance of covering different topics relating to the benchmark input entities/query input entities 210. Thus, matches between an output entity 208 and a more highly weighted benchmark output entity are weighted more highly in the evaluation than matches between an output entity 208 and a lower weighted benchmark output entity. Additionally, in some embodiments, for entities that have no matches, partial credit (i.e., the evaluation score increases by a more incremental value than for full matches) may be included in the evaluation score by evaluation scoring 204 if an output entity 208 relates to any benchmark output entity in the test set.

In some embodiments, evaluation scoring 204 generates the evaluation score for each query result (i.e., set of output entities 208) by first calculating a summary coverage score D and a maximum coverage score Max based on the size of the output entities set 208. Thus:

$$D = \sum_{i=1}^{n} i \times D_i$$

$$\text{Max} = \sum_{i=j+1}^{n} i \times |T_i| + j \times \left(X - \sum_{i=j+1}^{n} |T_i|\right)$$

where i is a distinct weight, n is the number of distinct weights, $D_i$ is the number of benchmark entities with weight i that were returned by the knowledge canvassing system 106 based on the query, X is the size of the benchmark output entity set measured in number of entities (i.e., the maximum number of entities the response can possibly cover), j is the lowest weight such that the sum of the entities with its weight or higher is greater than or equal to X, and $T_i$ is the set of entities with weight i. The evaluation score for a summary then is given by $$\frac{D}{\text{Max}}.$$

Thus, without weighting, D reduces to the number of matched entities (between the benchmark output entities and output entities 208) and Max reduces to the number of entities in the benchmark output entity set. Hence, the evaluation score for a summary, without weighting, is the percentage of entities from the benchmark output entity set that the knowledge canvassing system 106 returned from the query.

As discussed above partial credit may also be included in the evaluation score where unmatched output entities 208 and benchmark output entities are considered for potential matching based on proximity in the knowledge graph 114. The maximum possible score (Max) is unaffected because the highest possible score would have exact matches, but D is adjusted to:

$$D = \sum_{i=1}^{n} \left(1 \times \sum_{k=1}^{|T_i|} \text{maxmatch}_k\right)$$

where $\text{maxmatch}_k$ is the maximum match on any output entity 208 in the response to the kth benchmark output entity that has a weight i. Because this does not give any increase in the evaluation score for multiple partial matches to the same benchmark output entity, the system does not reward redundancy.

It should be appreciated that it may be assumed that the information of each association resides primarily in the paths of inquiry it leads to by indicating participation in a network or activity. It should also be appreciated that it may be inferred that other entities related to the benchmark output entity may provide partial coverage of the intended information by leading a user to explore a relationship that leads to the discovery of the more significant related entity. Thus, partial credit for partial coverage to such entities in the output entity set 208 is given. Evaluation scoring 204, thus, may calculate the best partial coverage from one peer unit and compare the coverage to the best possible for the number of entities returned in the output entity set 208. The partial match may be calculated by evaluation scoring 204 as $$\frac{1}{\text{links} + 1}$$

where links is the minimum number of links in the knowledge graph 114 between the knowledge canvassing system output entity 208 and the partially matched benchmark output entity in either direction without traversing the input entity.

In an embodiment, partial credit may also be extended to returned passages from the knowledge canvassing system 106 from a benchmark input entity query. Using the same calculation of D as listed above, a match between a knowledge canvassing system output entity 208 and a benchmark output entity receives full credit of 1. However, an unmatched pair of an output entity 208 and a benchmark output entity that co-occur in the same response passage receive a partial match score of ë, where ë is a parameterized value in the range [0,1].

After calculating the evaluation score for each benchmark input entity set in the test set, training system 102 may aggregate the evaluation scores for the entire test set. In some embodiments, this may include evaluation scoring 204 taking the mean of the results for each entity. Trainer 206 then may provide training to the knowledge canvassing system based on the evaluation score and/or aggregated evaluation score. In other words, the evaluation score and/or aggregated evaluation score may be provided by trainer 206 to the knowledge canvassing system 106, such that the knowledge canvassing system 106 provides more meaningful output entities to future queries (i.e., higher evaluation scores will be generated for future queries). More particularly, for each datum, trainer 206 may calculate a feature vector and assign weights to every feature. The trainer 206 may modify the weights to minimize a loss function based on the evaluation function defined above, thus training the knowledge canvassing system 106.

Figure 3:
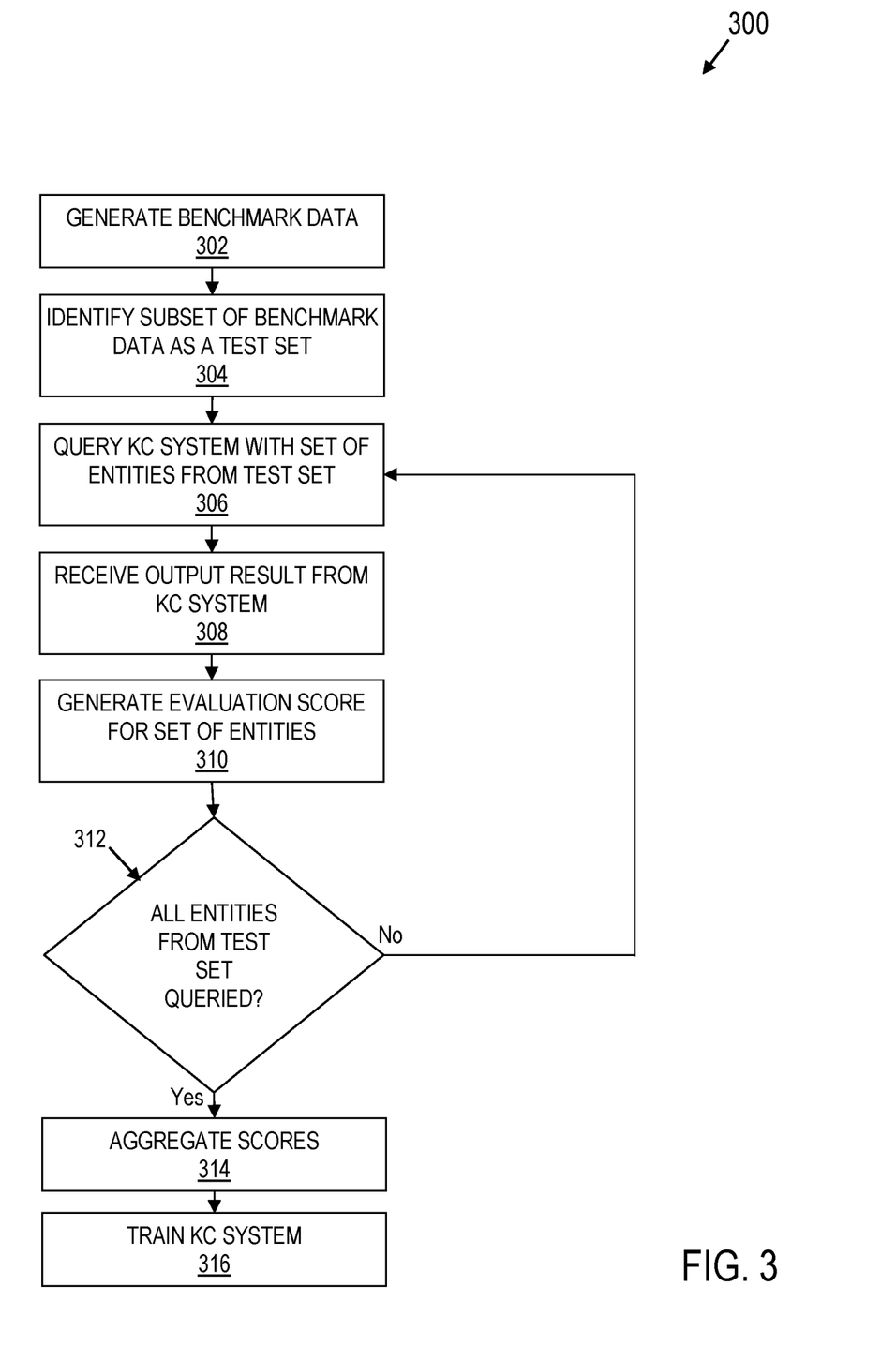
FIG. 3 shows a flow diagram illustrating aspects of operations that may be performed to evaluate and train a knowledge canvassing system in accordance with various embodiments.

FIG. 3 shows a flow diagram illustrating aspects of operations 300 that may be performed to evaluate and train a knowledge canvassing system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 300 may be provided by instructions executed by a computer of the system 100.

The method 300 begins in block 302 with generating benchmark data, such as benchmark data 104. The benchmark data may be generated either by the training system 102, by another computer system, and/or by human judges. Each benchmark datum of the benchmark data includes a set of one or more benchmark input entities and a set of one or more benchmark output entities associated with the one or more benchmark input entities. A benchmark output entity set represents meaningful and/or desirable entities corresponding with one benchmark input entity set.

In block 304, the method 300 continues with identifying a subset of benchmark data as a test set. For example, a subset of the benchmark data 104 (i.e., one or more benchmark input entity sets) may be identified by the training system 102 as a test set for evaluation. In some embodiments, a distinct subset of the benchmark data 104 (separate from the subset of benchmark data 104 utilized for evaluation) may be identified by the training system 102 as a training set for training the knowledge canvassing system 106. The method 300 continues in block 306 with querying a knowledge canvassing system with a set of input entities from the test set. For example, one or more benchmark input entities that makes up a single set of entities may comprise input entities for a query of the knowledge canvassing system 106 and knowledge graph 114.

In block 308, the method 300 continues with receiving an output result from the knowledge canvassing system. For example, after the knowledge canvassing system 106 receives the query (i.e., the benchmark input entity set), it processes the query and returns an output entity set utilizing knowledge graph 114. The training system 102 then receives the resulting output entity set 208 from the knowledge canvassing system 106. The method 300 continues in block 310 with generating an evaluation score for the output set of entities. For example, the training system 102 may compare the output entity set 208 received from knowledge canvassing system 106 to the corresponding benchmark output entity set (i.e., the benchmark output entity set corresponding with the benchmark input entity set queried) to calculate an evaluation score for the results returned by the knowledge canvassing system 106 for that particular query.

In block 312, the method 300 continues with determining whether the knowledge canvassing system has been queried with all the benchmark input entity sets in the test set. If a determination is made in block 312 that the knowledge canvassing system has not been queried with all the benchmark input entity sets in the test set, then the method 300 continues in block 306 with querying the knowledge canvassing system with another set of benchmark input entities from the test set. If, however, a determination is made in block 312 that the knowledge canvassing system has been queried with all the benchmark input entity sets in the test set, then the method 300 continues in block 314 with aggregating the evaluation scores for all of the output entity sets returned by the knowledge canvassing system. In some embodiments, the evaluation scores may be aggregated by averaging all of the evaluation scores. In block 316, the method 300 continues with training the knowledge canvassing system. For example, the evaluation score and/or aggregated evaluation score may be provided by the training system 102 to the knowledge canvassing system 106, such that the knowledge canvassing system 106 provides more meaningful output entities to future queries (i.e., higher evaluation scores will be generated for future queries). More particularly, for each datum, a feature vector may be calculated and weights assigned to every feature. The weights may be modified to minimize a loss function based on the evaluation function defined above.

Figure 4:
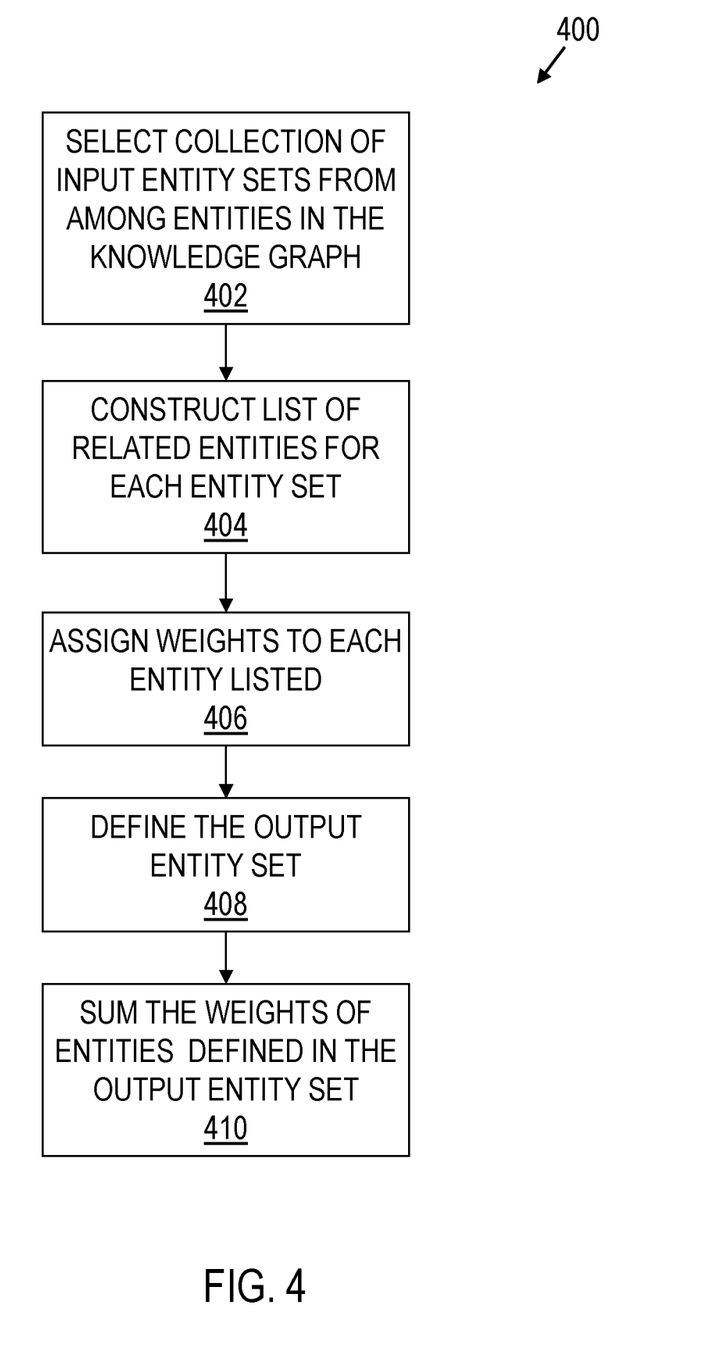
FIG. 4 shows a flow diagram illustrating aspects of operations that may be performed to generate benchmark data for a knowledge canvassing system in accordance with various embodiments.

FIG. 4 shows a flow diagram illustrating aspects of operations 400 that may be performed to generate benchmark data for a knowledge canvassing system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 400 may be provided by instructions executed by a computer of the system 100.

The method 400 begins in block 402 with selecting a collection of benchmark input entity sets from among entities in a knowledge graph. For example, the training system 102, other computing systems, and/or human judges may select benchmark input entity sets based on sample user queries of the canvassing system 106, random selections from the knowledge graph 114, human judges selecting entities that are likely to represent the types of entities of interest, or any other method.

In block 404, the method 400 continues with constructing a list of related entities for each of the benchmark input entity sets. For example, for each single datum (i.e., for each input benchmark entity set), one or more human judges may manually construct a list of what the judge deems as important related entities. For a benchmark input entity set of cardinality 1, the related entities (i.e., the set of benchmark output entities) are entities which each judge deems as important entities related to the benchmark input entity. For a benchmark input entity set containing multiple entities, the set of benchmark output entities constructed by each judge comprises entities which each judge deems as important entities related to a concept implied by the combination of the entities in the benchmark input entity set.

The method 400 continues in block 406 with assigning weights to each benchmark output entity that make up the benchmark output entity sets. For example, a human judge may assign a higher weight to entities that the judge deems more important and/or more related to the benchmark input entity and a lower weight to entities that the judge deems less important and/or less related to the benchmark input entity. In block 408, the method 400 continues with defining the benchmark output entity set for use by training system 102. For example, the benchmark output entity set for the given benchmark input entity set may be defined by the union of the associated benchmark output entity sets from all of the individual judges. The method 400 continues in block 410 with summing the weights of the entities defined in the benchmark output entity set. For example, the weight of a particular entity in a benchmark output entity set may be defined by the sum of weights assigned to each particular entity by each of the judges. In some embodiments, if no weight is assigned to a particular benchmark output entity by the judges, the weight for that particular entity may be defined by the sum of the number of human judges that listed the particular entity as a benchmark output entity.

Figure 5:
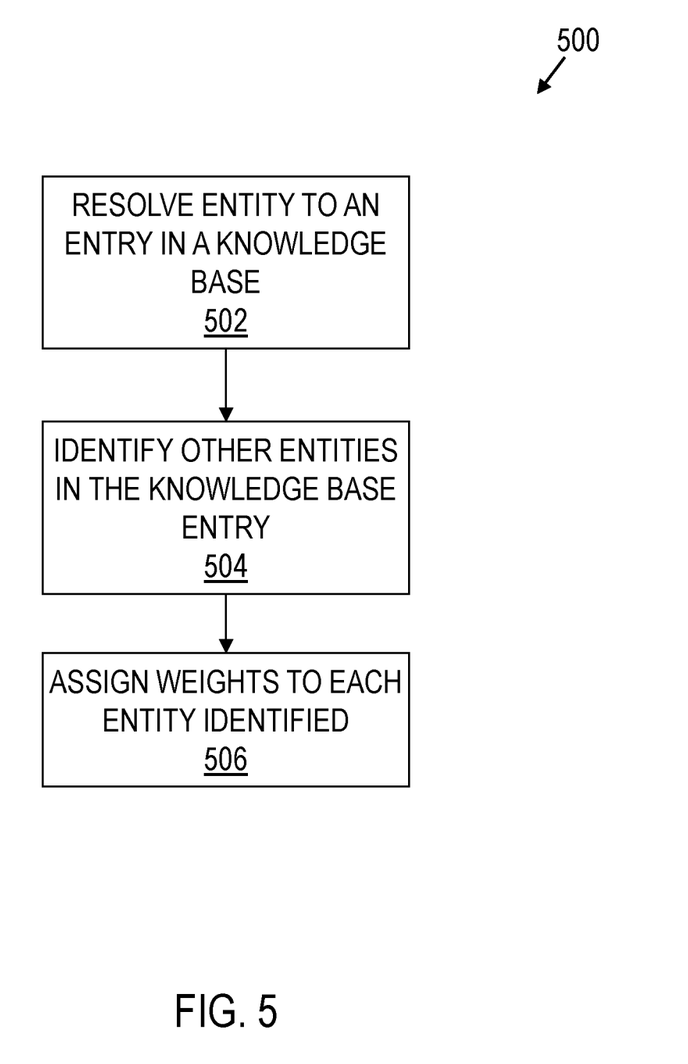
FIG. 5 shows a flow diagram illustrating aspects of operations that may be performed to generate benchmark data for a knowledge canvassing system in accordance with various embodiments.

FIG. 5 shows a flow diagram illustrating aspects of operations 500 that may be performed to generate benchmark data for a knowledge canvassing system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 500 may be provided by instructions executed by a computer of the system 100.

The method 500 begins in block 502 with resolving an entity to an entry in a knowledge base of reference documents. For example, the training system 102 may match the title of an entry in a knowledge base of reference documents to the benchmark input entity. The knowledge base of reference documents may be any reference resource such as encyclopedias, non-fiction literature, maps, and/or other resources online or offline resources. Thus, the training system 102 may crawl an online encyclopedia and/or stored encyclopedia and title match an entry in the encyclopedia to the benchmark input entity.

In block 504, the method 500 continues with identifying other entities included in the knowledge base entry. For example, an information extraction tool may run (i.e., crawl) over the entry to identify other entities that are contained in the knowledge base entry. The method 500 continues in block 506 with assigning weights to each entity identified. For example, the training system 102 may assign a weight to each entity identified by the information extraction tool based on the location of the entity in the knowledge base entry and/or based on the number of mentions that the entity receives in the knowledge base entry.

Figure 6:
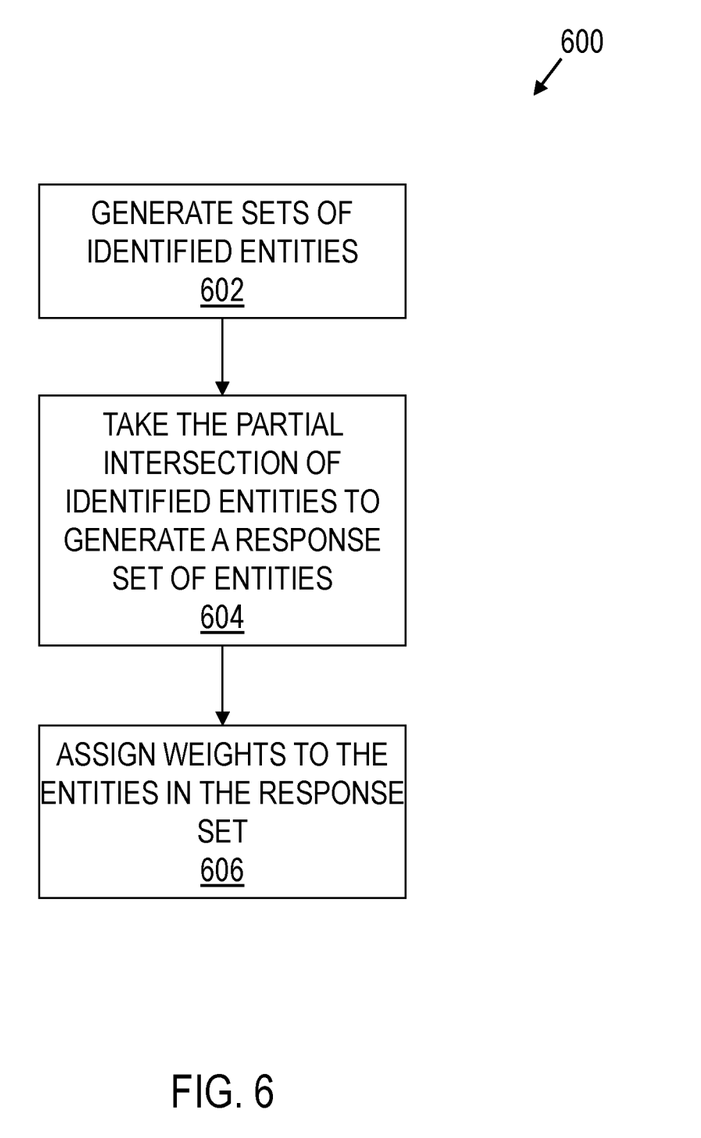
FIG. 6 shows a flow diagram illustrating aspects of operations that may be performed to generate benchmark data for a knowledge canvassing system in accordance with various embodiments.

FIG. 6 shows a flow diagram illustrating aspects of operations 600 that may be performed to generate benchmark data for a knowledge canvassing system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600 may be provided by instructions executed by a computer of the system 100.

The method 600 begins in block 602 with generating sets of identified entities. For example, training system 102 may resolve an entity set containing multiple entities to multiple corresponding entries in a knowledge base of reference documents. For example, the training system 102 may match the title of one entry in a knowledge base of reference documents to one entity in a benchmark input entity set and a second entry in the knowledge base of reference documents to another entity in the benchmark input entity set. An information extraction tool then may run (i.e., crawl) over the identified entries to identify other entities that are contained in the knowledge base entries.

In block 604, the method 600 continues with taking the partial intersection of the identified entities to generate a benchmark output entity set. For example, the training system 102 may generate the benchmark output entity set by including any entity that appears in two or more sets of identified entities. In other words, any entity that links at least two of the input entities in the benchmark input entity set are included in the benchmark output entity set.

The method 600 continues in block 606 with assigning weights to the entities identified in the benchmark output entity set. For example, the training system 102 may assign a weight to each entity identified by the information extraction tool based on location of an entity in the entry and/or number of mentions of the entity in the entry as discussed above. In an embodiment, the weights for the individual entity determinations may be summed, averaged, and/or normalized based on the number of words or number of paragraphs that the entity appears in the entry and then summed or averaged. In another embodiment, the training system 102 may assign a multiplicative or exponentiating factor for the number of individual entity sets in which a benchmark output entity appears, so as to more harshly penalize lower connectivity (as opposed to higher connectivity) when assigning the weight.

Figure 7:
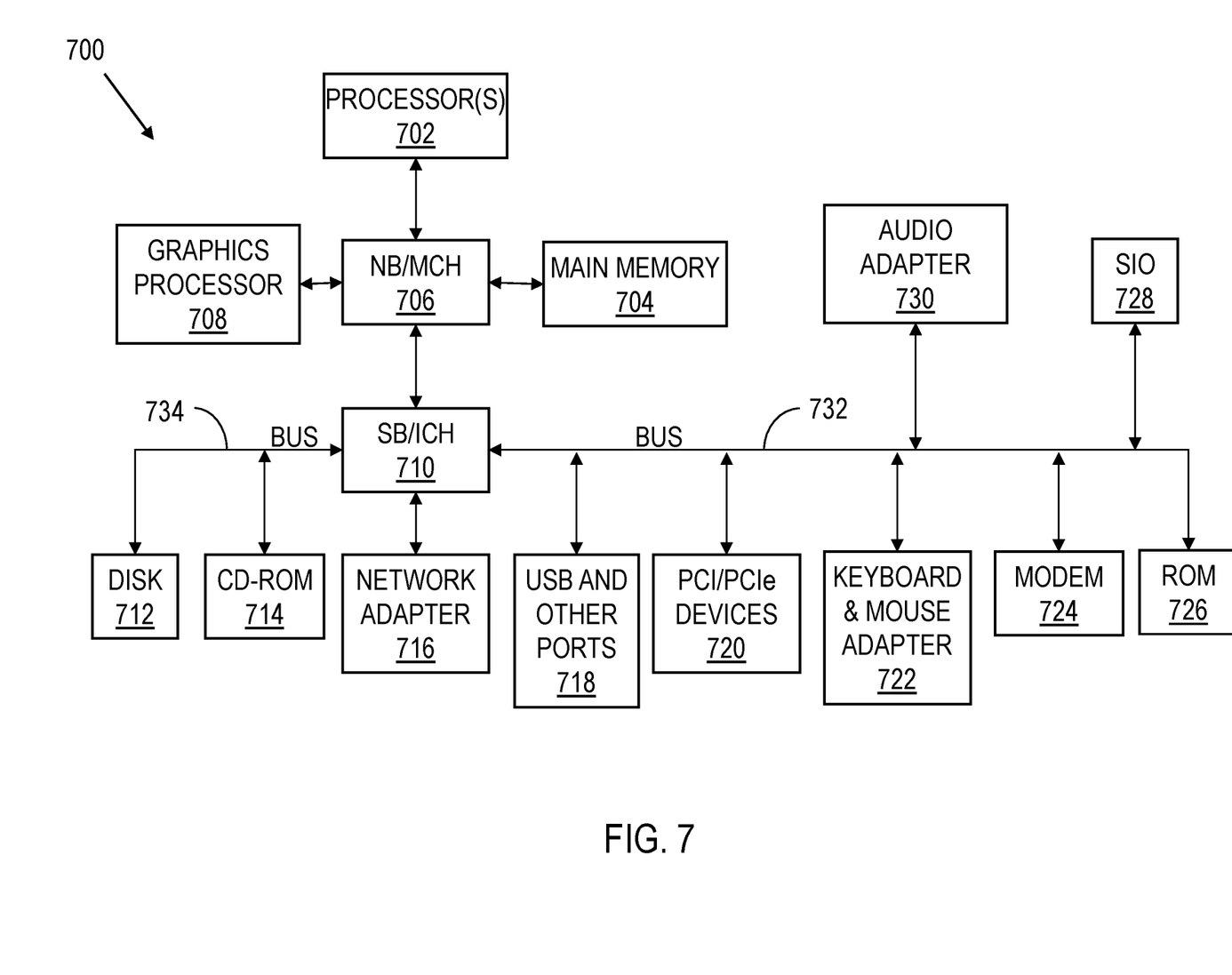
FIG. 7 shows an illustrative block diagram of an example data processing system that can be applied to implement embodiments of the present disclosure.

FIG. 7 is a block diagram of an example data processing system in which aspects of the illustrative embodiments may be implemented. Data processing system 700 is an example of a computer that can be applied to implement the training system 102, the knowledge canvassing system 106, or devices providing the benchmark data 104 access to the training system 102 in FIG. 1, in which computer usable code or instructions implementing the processes for illustrative embodiments of the present invention may be located. In one illustrative embodiment, FIG. 7 represents a computing device that implements the training system 102 augmented to include the additional mechanisms of the illustrative embodiments described hereafter.

In the depicted example, data processing system 700 employs a hub architecture including north bridge and memory controller hub (NB/MCH) 706 and south bridge and input/output (I/O) controller hub (SB/ICH) 710. Processor(s) 702, main memory 704, and graphics processor 708 are connected to NB/MCH 706. Graphics processor 708 may be connected to NB/MCH 706 through an accelerated graphics port (AGP).

In the depicted example, local area network (LAN) adapter 716 connects to SB/ICH 710. Audio adapter 730, keyboard and mouse adapter 722, modem 724, read only memory (ROM) 726, hard disk drive (HDD) 712, CD-ROM drive 714, universal serial bus (USB) ports and other communication ports 718, and PCI/PCIe devices 720 connect to SB/ICH 710 through bus 732 and bus 734. PCI/PCIe devices may include, for example, Ethernet adapters, add-in cards, and PC cards for notebook computers. PCI uses a card bus controller, while PCIe does not. ROM 726 may be, for example, a flash basic input/output system (BIOS).

HDD 712 and CD-ROM drive 714 connect to SB/ICH 710 through bus 734. HDD 712 and CD-ROM drive 714 may use, for example, an integrated drive electronics (IDE) or serial advanced technology attachment (SATA) interface. Super I/O (SIO) device 728 may be connected to SB/ICH 710.

An operating system runs on processor(s) 702. The operating system coordinates and provides control of various components within the data processing system 700 in FIG. 7. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 700.

In some embodiments, data processing system 700 may be, for example, an IBM® eServer™ System p® computer system, running the Advanced Interactive Executive (AIX®) operating system or the LINUX® operating system. Data processing system 700 may be a symmetric multiprocessor (SMP) system including a plurality of processors 702. Alternatively, a single processor system may be employed.

Instructions for the operating system, the object-oriented programming system, and applications or programs are located on storage devices, such as HDD 712, and may be loaded into main memory 704 for execution by processor(s) 702. The processes for illustrative embodiments of the present invention may be performed by processor(s) 702 using computer usable program code, which may be located in a memory such as, for example, main memory 704, ROM 726, or in one or more peripheral devices 712 and 714, for example.

A bus system, such as bus 732 or bus 734 as shown in FIG. 7, may include one or more buses. The bus system may be implemented using any type of communication fabric or architecture that provides for a transfer of data between different components or devices attached to the fabric or architecture. A communication unit, such as modem 724 or network adapter 716 of FIG. 7, may include one or more devices used to transmit and receive data. A memory may be, for example, main memory 704, ROM 726, or a cache such as found in NB/MCH 706 in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   generating benchmark data, each benchmark datum including a set of one or more benchmark input entities and a set of one or more benchmark output entities associated with the one or more benchmark input entities;

querying a machine-learning knowledge canvassing system with each set of benchmark input entities;
receiving a returned passage from the machine-learning knowledge canvassing system in response to the querying;
receiving, for each set of benchmark input entities queried, an output result from the machine-learning knowledge canvassing system that includes a set of zero or more knowledge canvassing system output entities;
generating an evaluation score for each set of knowledge canvassing system output entities based on a comparison of the knowledge canvassing system output entities with the set of benchmark output entities, wherein the comparison includes estimating a degree to which a knowledge canvassing system output entity in a first set of the knowledge canvassing system output entities relates to a benchmark output entity in a first set of the benchmark output entities, wherein estimating the degree to which the knowledge canvassing system output entity relates to the benchmark output entity is based on a co-occurrence, in a returned passage from the machine-learning knowledge canvassing system, of the knowledge canvassing system output entity and the benchmark output entity, and wherein the knowledge canvassing system output entity does not match any of the benchmark output entities in the first set of benchmark output entities; and
training the machine-learning knowledge canvassing system based on the evaluation scores.

2. The method of claim 1, further comprising assigning weights to each benchmark output entity to generate a weighted benchmark output entity, wherein the comparison further includes matching any knowledge canvassing system output entity in a first set of knowledge canvassing system output entities to a weighted benchmark output entity in a first set of weighted benchmark output entities.

3. The method of claim 1, further comprising aggregating the evaluation scores.

4. The method of claim 3, wherein aggregating the evaluation scores includes, averaging the evaluation scores.

5. A system, comprising:
a machine-learning knowledge canvassing system;
a processor; and
a memory coupled to the processor, the memory encoded with instructions that when executed cause the processor to:
  generate benchmark data, each benchmark datum including a set of one or more benchmark input entities and a set of one or more benchmark output entities associated with the one or more benchmark input entities;
  query the machine-learning knowledge canvassing system with each set of benchmark input entities;
  receive a returned passage from the machine-learning knowledge canvassing system in response to the query;
  receive, for each set of benchmark input entities queried, an output result from the machine-learning knowledge canvassing system that includes a set of zero or more knowledge canvassing system output entities;
  generate an evaluation score for each set of knowledge canvassing system output entities based on a comparison of the knowledge canvassing system output entities with the set of benchmark output entities, wherein the comparison includes an estimation of a degree to which a knowledge canvassing system output entity in a first set of the knowledge canvassing system output entities relates to a benchmark output entity in a first set of the benchmark output entities, wherein the estimation of the degree to which the knowledge canvassing system output entity relates to the benchmark output entity is based on a co-occurrence, in a returned passage from the machine-learning knowledge canvassing system, of the knowledge canvassing system output entity and the benchmark output entity, and wherein the knowledge canvassing system output entity does not match any of the benchmark output entities in the first set of benchmark output entities; and
  train the machine-learning knowledge canvassing system based on the evaluation scores.

6. The system of claim 5, wherein the instructions when executed further cause the processor to assign weights to each benchmark output entity to generate a weighted benchmark output entity for each benchmark output entity, and wherein the comparison further includes matching any knowledge canvassing system output entity in a first set of knowledge canvassing system output entities to a weighted benchmark output entity in a first set of weighted benchmark output entities.

7. The system of claim 6, wherein the instructions when executed further cause the processor to increase the evaluation score for the first set of knowledge canvassing system output entities in response to an increase in the weight of the weighted benchmark output entity.

8. The system of claim 5, wherein the evaluation score includes a summary coverage score and a maximum coverage score, the maximum coverage score being based on a size of a first set of benchmark output entities.

9. The system of claim 8, wherein the summary coverage score is related to a percentage of benchmark output entities matched by a first set of knowledge canvassing system output entities.

10. The system of claim 5, wherein the estimation is based on proximity in a knowledge graph.

11. A computer program product for training a machine-learning knowledge canvassing system, the computer program product comprising a computer readable storage medium having program instructions embodied therewith, the program instructions executable by a computer to cause the computer to:
generate benchmark data, each benchmark datum including a set of one or more benchmark input entities and a set of one or more benchmark output entities associated with the one or more benchmark input entities;
query the machine-learning knowledge canvassing system with each set of benchmark input entities;
receive a returned passage from the machine-learning knowledge canvassing system in response to the query;
receive, for each set of benchmark input entities queried, an output result from the machine-learning knowledge canvassing system that includes a set of zero or more knowledge canvassing system output entities;
generate an evaluation score for each set of knowledge canvassing system output entities based on a comparison of the knowledge canvassing system output entities with the set of benchmark output entities, wherein the comparison includes an estimation of a degree to which a knowledge canvassing system output entity in a first set of the knowledge canvassing system output entities relates to a benchmark output entity in a first set of the benchmark output entities, wherein the estimation of the degree to which the knowledge canvassing system output entity relates to the benchmark output entity is based on a co-occurrence, in a returned passage from the machine-learning knowledge canvassing system, of the knowledge canvassing system output entity and the benchmark output entity, and wherein the knowledge canvassing system output entity does not match any of the benchmark output entities in the first set of benchmark output entities; and train the machine-learning knowledge canvassing system based on the evaluation scores.

12. The computer program product of claim 11, wherein the program instructions are further executable by the computer to cause the computer to assign weights to each benchmark output entity to generate a weighted benchmark output entity for each benchmark output entity, and wherein the comparison further includes matching any knowledge canvassing system output entity in a first set of knowledge canvassing system output entities to a weighted benchmark output entity in a first set of weighted benchmark output entities.

13. The computer program product of claim 12, wherein the evaluation score includes a summary coverage score and a maximum coverage score, the maximum coverage score being based on a size of a first set of benchmark output entities.

14. The computer program product of claim 13, wherein the summary coverage score is related to a percentage of benchmark output entities matched by any set of knowledge canvassing system output entities.

15. The computer program product of claim 12, wherein the estimation is based on proximity in a knowledge graph.

* * * * *